United States Patent Office 3,175,981
Patented Mar. 30, 1965

3,175,981
METHOD FOR PRODUCING SILICA
HYDRO-ORGANOSOLS
Wilson H. Power, St. Louis, Mo., assignor to Monsanto
Company, a corporation of Delaware
No Drawing. Filed Mar. 14, 1961, Ser. No. 95,491
15 Claims. (Cl. 252—306)

The present invention relates to improvements in processes of preparing silica hydro-organosols of low salt content, wherein an acidic hydro-organosol containing a salt is contacted with a cation-exchange material and an anion-exchange material. This invention additionally relates to methods for reconditioning the sulfate form of water-insoluble anion-exchange materials used in such processes, and more particularly relates to improved processes for restoring the capacity of such water-insoluble anion-exchange materials and has particular reference to improved processes of preparing silica hydro-organosols of low salt content which processes were disclosed in my application Serial No. 860,625, filed December 21, 1959, now abandoned. The disclosure contained in the present application should be taken in conjunction with said application for Letters Patent Serial No. 860,625 and considered as a continuation-in-part of said application.

It has been proposed heretofore in United States Patent No. 2,285,477 to John F. White, patented June 9, 1942, to remove alkali metal salts from acidic aqueous silica sols by adding to such sols an organic solvent (for example, ethanol) miscible with water, to give a mixed hydro-organosol. The addition of such organic solvent and the cooling of the sol causes a substantial portion of the inorganic alkali metal salt to precipitate. On the removal of said salt the stability of the resulting sol is improved. However, the sol obtained varies in stability depending upon the pH of the sol, the amount of inorganic salt remaining in the sol and the temperature at which the sol is stored. Even so, the sols thus obtained have limited stability, usually varying from an hour or less up to two weeks, and hence are considerably less stable toward gelation than alkaline silica aquasols which usually have a stability of several months and longer at normal room temperatures. The alcosols of the White patent may be autoclaved in the same way that the alcogels are treated by the process of United States Patent No. 2,093,454 to Samuel S. Kistler, patented September 21, 1937, to provide a silica aerogel.

The hydro-organosols of the White patent contain varying amounts of inorganic salt, depending upon the acid and the silicate employed, the concentration of organic solvent and silica in the sol, the temperature of the sol and other factors. However, the minimum organic salt concentration in the sol is about 0.1 to 0.3% by weight based on the sol. This salt content is objectionable for certain uses of the sol, for example, when it is desired to produce a silica coating or film, having low electrical conductivity or water conductivity from the sol. Moreover, when the sol is autoclaved to form a silica aerogel, the minimum quantity of inorganic salt is about 1% to 3% by weight of the aerogel. Because of this relatively high electrolyte content, the aerogel is not entirely satisfactory as a filler in silicone rubbers which are to be used as insulating materials, or in other applications where low electrical conductivity is essential. The above remarks with respect to the sols of the said White patent, and the aerogels produced therefrom, also apply to the acidic hydro-organosols produced by the process of United States Patent No. 2,285,499 to Morris D. Marshall, patented June 9, 1942, and to the aerogels prepared from such sols.

It has also been proposed heretofore, in U.S. patent application Serial No. 761,957, now U.S. Patent 3,051,657, of Wilson H. Power, filed September 19, 1958, assigned to the same assignee as the present patent application, to remove all or substantially all of the salt from the above-described hydro-organosols. In such a process, an acidic silica hydro-organosol having a pH of about 3.0 to 4.5 and containing relatively small amounts (that is to say from 0.1% to 1.0% by weight) of an alkali metal salt is contacted, at a temperature of below 30° C., in any sequence, with the hydrogen form of a water-insoluble strong cation-exchange material until the sol has a pH of between 1.8 and 2.5 and with the sulfate form of a water-insoluble anion-exchange material containing a plurality of salt-forming nitrogen atoms and the sol is removed from contact with said anion-exchange material before the pH of the sol exceeds 4.5. Such a process usually results in acidic silica hydro-organosols which are free or substantially free of salts, that is sols which contain less than 0.05% by weight of salts such as sodium sulfate or the process is repeated until such conditions are obtained. Aerogels which are substantially free of salts have greater utility (in that they can be used in electrical insulating compositions, as fillers in silicone rubber or in other applications where low electrical conductivity is essential) than the prior art aerogels referred to above, are easily prepared from such hydro-organosols.

After the capacity of the cation-exchange material, employed in said process to remove cations, has been exhausted or substantially exhausted, it is restored by contacting the cation-exchange material with aqueous solutions of mineral acids to convert the material from the alkali metal form to the acid or hydrogen form. On the other hand, after the capacity of the sulfate form of the water-insoluble anion-exchange material containing a plurality of salt-forming nitrogen atoms to remove mineral acid anions from the aforementioned acidic silica hydro-organosols becomes exhausted or substantially exhausted, the capacity of such material is usually restored by contacting the anion-exchange material with water to remove mineral acid anions and to convert it from the bisulfate form to the sulfate form. If the anion-exchange material which has been regenerated with water is again contacted with fresh acidic hydro-organosol, as in the process of said Power application, and this entire process is repeated, its capacity to remove mineral acid anions diminishes slightly and this diminution in capacity progresses until, after such process of removing mineral acid anions is repeated a considerable number of times, the capacity of the anion-exchange material to remove mineral acid anions is substantially decreased as compared to the original capacity of such material. During this progressive loss of capacity the anion-exchange material gradually increases in density, requiring a greater pumping pressure during the water-regeneration step, as well as substantially greater amounts of water. Thus, if it is desired to water-regenerate a fixed resin bed in an upwardly direction a greater water-flow rate will be required.

Such loss of capacity renders the above-described process less economical than is desired in that the volume yield of low mineral acid acidic silica hydro-organosol, which is contacted with such anion-exchange material, becomes less for each anion-exchange cycle and substantially more frequent water regenerations are required. Furthermore, such anion-exchange material must, because of its marked loss of capacity, eventually be replaced, occasioning the expense of its removal from the manufacturing system in addition to the material cost of its replacement. The aforementioned process of said Power application is concerned with providing salt-free or substantially salt-free acidic silica hydro-organosols, and does not relate to any process for the solution of the above-referred to problems of loss in capacity in the repetitive utilization of the sulfate form of weak or strong anion-exchange materials containing a plurality of salt forming nitrogen atoms in the removal of mineral acid anions from such sols.

It is accordingly one object of this invention to provide an improved process for utilizing the same anion-exchange materials repetitively in the preparation of salt-free or substantially salt-free silica hydro-organosols, particularly acidic silica ethanol-aquasols.

It is a further object of this invention to provide a method for reconditioning the sulfate form of water-insoluble, anion-exchange materials containing a plurality of salt-forming nitrogen atoms, which has been used repetitively in reducing the mineral acid anion portion of the salt content of acidic silica hydro-organosols and which has lost a considerable percentage of its original capacity for such purpose after repeated use.

It is a further object of this invention to provide a method for reconditioning the bisulfate form of water-insoluble, anion-exchange materials containing a plurality of salt-forming nitrogen atoms and has been used repetitively as above-described.

It is a still further object of this invention to provide an improved process for more efficiently utilizing water-insoluble anion-exchange materials containing a plurality of salt-forming nitrogen atoms which has been repetitively used in the removal of mineral acid anions from acidic silica hydro-organosols, particularly acidic silica ethanol-aquasols.

Still further objects and advantages of this invention will become apparent from the following description and the appended claims.

It has presently been found that when the sulfate form of a water-insoluble anion-exchange material containing a plurality of salt-forming nitrogen atoms has lost a considerable portion of its capacity to remove mineral acid anions from acidic silica hydro-organosols (even when the exhausted or bisulfate form of exchange material has been regenerated with water to such sulfate form) after being used repetitively in a process such as, for example, that described in said Power's application, such anion-exchange material can be reconditioned according to the processes described herein so that a substantial part or substantially all of its original capacity in the sulfate form to remove mineral acid anions from such acidic silica hydro-organosols is restored.

Such process of reconditioning such anion-exchange materials can be accomplished or carried out, in general, in accordance with the present invention, by contacting such anion-exchange material with from about 12 to about 20 pounds of an alkali metal hydroxide (in the form of an aqueous solution) per cubic foot of the anion-exchange material. Stated differently the amount of alkali metal hydroxide used in said restoration is between about 500% and 650% of the amount theoretically required to convert the anion-exchange material to the hydroxide or base form. The anion-exchange materials to be reconditioned may be either in the sulfate form, in the bisulfate form or partially in the sulfate and bisulfate forms when contacted with the alkali metal hydroxide solution in the aforementioned amounts as above-described to recondition such anion-exchange materials.

As used herein the terms "regeneration" or "regenerating" as used in relation to the anion-exchange materials are intended to means the conversion of the anion-exchange material, which may be in the bisulfate form or partially in the bisulfate and sulfate forms, that is, after it has been used to remove mineral acid anions from such acidic silica hydro-organosols, to the sulfate form by treatment with water. As used herein the terms "reconditioned" or "reconditioning" are intended to mean the process or treatment of such anion-exchange material (in the sulfate and/or bisulfate form) which may or may not be regenerated but which has been repeatedly used and regenerated and which has lost a considerable or appreciable portion of its capacity to remove mineral acid ions from acidic silica hydro-organosols after repetitive use in such processes as, for example, the process of said Power's application.

The loss of anion-exchange capacity, for which reconditioning is necessary, is believed to occur as follows. During each individual contact between the sol and the sulfate form of a water-insoluble strong anion-exchange resin containing a plurality of salt-forming nitrogen atoms only relatively small quantities of silica and/or silicic acid are deposited on the particles or beads of the anion-exchange material, but such silica and/or silicic acid is not substantially removed by the above-described water regeneration and thus progressively accumulates or accretes. It is believed that this siliceous material, that is silica and/or silicic acid, cumulatively accretes on the surfaces and in the pores of the anion-exchange resin, thereby effecting a progressive loss in the capacity of the resin to remove mineral mineral acid anions from such sols.

It should be noted, however, that this invention, and the processes of this invention described herein are not intended to be limited by the theory and theoretical considerations contained in this description. The fact remains that after the anion-exchange resin has been used repetitively to remove mineral acid anions from the aforementioned sols and is regenerated to the sulfate form by water regeneration after each use or cycle, the anion-exchange resin loses a substantial percentage of its original capacity to remove said anions from such sols and must be reconditioned if economical use thereof is to be attained.

As the loss of capacity and accretion of the siliceous material on the beads or particles of the anion-exchange resins progresses with each anion-exchange water regeneration cycle, the loss of capacity of the anion-exchange resin to remove mineral acid anions is also accompanied by a progressive increase in the density of the anion-exchange resin. During the above-described water regeneration steps of each cycle, the resin is observed to become progressively heavier requiring an increase in water pressure with each successive cycle to force the water through the resin particles or beads.

Also, as the anion-exchange materials become increasingly contaminated with siliceous accretions, such accretions appear to "fix" or maintain the anion-exchange material in a particular form. Thus, for example, siliceous accretion may prevent the sulfate form from being converted to the bisulfate form by exchanging mineral acid anions. On the other hand such accretions may prevent the regeneration with water of the exchange resin or material from the bisulfate form to the sulfate form. In any event when the resin is exhausted (that is, no longer is capable of removing mineral acid anions) it is usually in the form of a mixture of the sulfate form and the bisulfate form and the amount of resin which is in the sulfate form will depend on whether or not the resin has been regenerated with water prior to being contacted with the alkali metal hydroxide solution.

When the anion-exchange resin has not previously been used for any purpose, or has been reconditioned in accordance with the processes of this invention, the volume of acidic silica hydro-organosol which can be contacted with such resin (prior to its regeneration from the bisulfate to the sulfate form with water) to remove mineral acid anions from such sol will vary to some extent depending upon the mineral acid content of the sol. As noted above, from the operation of the process of said power application, the volume of acidic silica hyrdo-organosols (from which mineral acid anions can be removed) decreases with each successive anion-exchange-water regeneration cycle until the volume of the sol which can be contacted with such anion-exchange resin to remove mineral acid anions from the sol is materially reduced. Thus, the anion-exchange resin has lost a substantial portion of the capacity in a single cycle, to remove said mineral acid anions during any particular cycle of removing mineral acid anions from such sol.

The process of this invention, which comprises the reconditioning of the anion-exchange material with an alkali metal hydroxide can be practiced after such material has been used for two or three cycles of mineral acid anion removal from acidic silica hydro-organosols. The process can also be practiced after from two or three, up to about nine such cycles or when the capacity of the anion-exchange material to remove mineral acid anions has decreased by about one third of its original capacity as measured by the volume of the sol which can be passed through a bed of anion-exchange resin for removal of mineral acid anions. However, it is preferred to carry out the reconditioning after the anion-exchange material has been used for a minimum of 15 such cycles and preferably after from 15 to 50 of such cycles. It has been observed that after about 20 anion-exchange-water regeneration cycles, the capacity of the anion-exchange resin to remove anions from acidic silica hydro-organosols has been reduced by about one-half of its original capacity or, stated differently, the volume of such sol which can be passed throught he resin bed is about one-half the volume of sol which could be passed through said resin during the first cycle. Such loss of anion-exchange capacity results in uneconomical process conditions.

The aforementioned sulfate and/or bisulfate form of anion-exchange resin which has lost its capacity, presumably due to the above-described accretions of siliceous matter, is contacted as previously noted, that is, reconditioned, with the aqueous solution of an alkali metal hydroxide to restore a substantial percentage of its original capacity and to convert it to the hydroxide or base form. This contact or reconditioning is preferably continued until at least 70% and more, preferably at least up to 80%, of its capacity to remove mineral acid anions has been restored. Most desirably, the contact is continued until substantially all of the siliceous materials are removed and the density of the anion-exchange material is substantially restored to its original value.

Any alkali metal hydroxide can be used in the above-described treatment, including lithium hydroxide, potassium hydroxide, sodium hydroxide, and the like, but it is preferred to use an aqueous solution of sodium hydroxide.

The alkali metal hydroxide may be contacted with the anion-exchange resin (which may be either in the sulfate or bisulfate form or partially in the sulfate and partially in the bisulfate form) in various ways including stirring the resin with such hydroxide solution and filtering, or by passing an aqueous solution of the alkali metal hydroxide upwardly or downwardly through a column or "fixed bed" of the anion-exchanger resin. It is preferred however, to contact a fixed bed of the resin, which has lost its capacity as hereinbefore described and requires reconditioning, with an aqueous solution of an alkali metal hydroxide, the direction of flow of such hydroxide solution, being either current or counter-current to the direction in which the acidic silica hydro-organosols have been previously passed through the anion-exchange resin bed. This direction of flow of the hydroxide solution is usually upwardly through the resin bed.

The length of time in which the above-described anion-exchange resin is contacted with the alkali metal hydroxide will vary depending upon the amount of alkali metal hydroxide used, the concentration of the alkali metal hydroxide solution used, and the rate of flow of such hydroxide through the anion-exchange resin bed. Generally satisfactory results are obtained with a contact period of about 10 to 90 minutes. The concentration of the solution of alkali metal hydroxide and the rate of flow of such solution through the anion-exchange resin bed are usually adjusted so that from 20 to 40 minutes and preferably about 30 minutes are required to recondition the resin and convert it to the base or hydroxide form.

The amount of alkali metal hydroxide used and the concentration of the solution of such hydroxide is critical. Thus, if the amount and concentration of the hydroxide solution is too great the resin will decompose. On the other hand if the amount and concentration of the hydroxide solution is too low, reconditioning of the resin cannot be accomplished and a siliceous gel forms in the resin bed which renders such bed unsatisfactory for further use.

It has presently been found that the anion-exchange resin (which has lost a substantial portion of its capacity after repetitive use as previously described) can be reconditioned without decomposing such resin and without gelation of the aforementioned siliceous materials by treating or contacting such resin, when in either the bisulfate form, the sulfate form or when partially in the sulfate and in the bisulfate forms, with an aqueous solution of an alkali metal hydroxide containing from about 4% to about 12% by weight of such hydroxide and employing such solution in amounts sufficient to provide from about 12 to about 20 pounds of alkali metal hydroxide per cubic foot of such resin.

The above-described amount of alkali metal hydroxide (from 12 to 20 pounds per cubic foot of resin) required to recondition the anion-exchange resin is from 4 to 7 times the amount required to convert said anion-exchange resin (which is unused or has been reconditioned) from the sulfate and/or bisulfate form to the hydroxide form.

A preferred embodiment of this invention for reconditioning such anion-exchange resins comprises contacting the anion-exchange resin, which has lost an appreciable percentage of its capacity as previously described herein, presumably through siliceous accretions, with an aqueous solution of sodium hydroxide containing from about 6% to 10%, and more preferably 8%, by weight of NaOH until the anion-exchange resin has been contacted with about 14 to 18 pounds, more preferably by about 16 pounds, of NaOH per cubic foot of resin, the latter representing about five and one half times the amount of NaOH theoretically required to convert the anion-exchange resin from the bisulfate and/or the sulfate forms to the hydroxide or base form.

Normally, in the usual processes of converting the sulfate and/or bisulfate forms of an anion-exchange resin to the base or hydroxide form, the actual amount of alkali metal hydroxide employed or required is a little more than, say about 15% to 30% in excess of, the theoretical amount for such conversion. It can be seen from this that the amounts of alkali metal hydroxide required to recondition anion-exchange resins in accordance with the processes of this invention are materially higher and different in kind from the amounts normally required to convert such anion-exchange resins from the sulfate or bisulfate form to the hydroxide form and were unforeseeably and unexpectedly different from what would be expected to one skilled in the art.

When the anion-exchange resin is in the hydroxide form, it can be used to remove anions from various liquids other than acidic silica hydro-organosols without converting said anion-exchange resin to the sulfate form. However, when such resins are used to remove mineral acid anions from acidic silica hydro-organosols as in the process of said Power application it is necessary to convert the hydroxide form to the sulfate form and to use the sulfate form of such ion-exchange resins.

When it is desired or necessary to convert the hydroxide or base form of anion-exchange materials to the sulfate form, such conversion can be accomplished by the following procedures. The anion-exchange material is first converted to the bisulfate form by contacting the material with an aqueous solution of sulfuric acid which preferably contains 5% to 15%, but more preferably about 10%, $H_2SO_4$ by weight. The bisulfate form of the anion-exchange resin is then regenerated to the starting sulfate form by contacting such material with water after which it can again be used to remove mineral acid anions from various liquids and acidic silica hydro-organosols.

PROCESS OF REMOVING SALTS FROM ACIDIC SOLS

In carrying out the general process of removing alkali metal salts from acidic silica hydro-organosols, for example as in the said process of said Power application, the removal of the alkali metal cation of such salt is accomplished by the use of a strong cation-exchange material. The reaction between the metallic cation of the alkali metal salt present in the acidic silica hydro-organosol and the cation-exchange material may be represented by the following equation:

$$M^+ + HR \rightarrow MR + H^+$$

where $M^+$ is the metallic cation and R is the water-insoluble portion of the cation-exchange material. It is apparent from this equation that the cation-exchange material employed herein is used in the hydrogen form or operated on the hydrogen cycle. When this material is no longer capable of removing cations from the sol, it can be, and usually is, regenerated by treatment with a mineral acid such as sulfuric or hydrochloric acid to convert it to the hydrogen form. The regenerating acid solution is thus at least partly converted to a solution containing some mineral acid, the salt of the anion of such acid and the metallic cation, for example, a salt such as sodium sulfate or sodium chloride.

The cation-exchange material must be a "strong cation-exchange material," by which term is meant a material that will remove metallic cations from hydro-organo solutions at a pH as low as 2. These materials are of a resinous nature and are characterized by water insolubility. They are electrolytes having an enormous non-diffusible anion and a simple diffusible cation. It is preferred that the anion be a sulfonic acid group which includes nuclear sulfonic acid groups as well as alkylene sulfonic acid groups.

Examples of sulfonic acid cation-exchange resins are the water-insoluble phenolic methylene sulfonic resins such as those obtained by reacting phenol, formaldehyde and sulfuric acid, or an alkali metal sulfate such as those described in U.S. 2,477,328. Still other sulfonic acid cation-exchange resins are the water-insoluble vinyl aromatic compounds containing nuclear sulfonic acid groups such as those described in U.S. 2,366,007.

One of the preferred cation-exchange resins for use in accordance with this process is the water-insoluble aromatic hydrocarbon copolymer of a monovinyl aromatic hydrocarbon and a polyvinyl aromatic hydrocarbon, for example a copolymer of styrene and divinyl benzene, containing nuclear sulfonic acid groups, e.g., the commercially available material designated "Dowex" 50 which is fully described as to its characteristics, properties and chemical constitution in volume 69, p. 2830, of the Journal of the American Chemical Society, November 1947. The preparation of such materials and the chemical constitution thereof is described in U.S. 2,466,675. In general, the cation-exchange materials which have a titration curve similar to that shown in Figure 1, page 88, of "Analytical Chemistry," volume 21 (1949), are satisfactory. The preferred cation-exchange materials have a capacity of at least 1, and preferably 2.5, milligram equivalents per gram of dry material.

In carrying out the general process of removing the mineral acid anion of the alkali metal salts from acidic silica hydro-organosols, for example, as in the process of said Power application, such anions are removed by the use of the sulfate form of a weak anion-exchange material. The reaction between the mineral acid anions in the sol and the sulfate form of an anion-exchange material containing a plurality of salt forming nitrogen atoms may be represented by the following equations which probably represent the equilibrium conditions.

(I) $H_2SO_4 + 2R_1-(NH_2)_x \rightarrow R_1-(NH_3)_{x2} \cdot SO_4$ (II) $R_1-(NH_3)_{x2} \cdot SO_4 + H^+A^-$
$\rightarrow R_1-(NH_3)_x HSO_4 + R_1-(NH_3)_x A$ where $A^-$ is the anion of a mineral acid, for example $Cl^-$, $SO_4^{--}$, $HSO_4^-$, $PO_4^{---}$, and $R_1-(NH_2)_x$ is the water-insoluble portion of the anion-exchange material. Thus, the above Equation II illustrates the absorption or removal of mineral acid anions in the hydro-organosol by the use of the sulfate form of an anion-exchange material composed of a plurality of salt-forming nitrogen atoms, for example, amino groups or imino groups. The anion-exchange material employed herein is "the sulfate form of an anion-exchange resin" by which term is meant a water-insoluble material which will readily absorb or remove mineral acid anions from an acidic hydro-organo solution at a relatively low pH say a pH of between 2 and 4.5 (glass electrode), but will only remove such anions slowly as the pH approaches 7.0. Either the sulfate form of a weak anion-exchange material or the sulfate form of a strong anion-exchange material can be used but it is definitely preferred to employ the sulfate form of a strong anion-exchange material since such material can be regenerated from the exhausted bisulfate form much more quickly and cheaply than is the case if the sulfate form of a weak anion-exchange material is employed.

In contrast to the foregoing, the base form of a strong anion-exchange material, which removes mineral acid anions from the sol at a pH above 7, cannot be employed since such material removes silicic acid as well as mineral acid anions from the sol with a consequent loss of silica from the sol and a very rapid loss in the anion-exchange capacity of such material.

It will also be noted from Equation II above that the removal of mineral acid anions from the sol will result in an increase in the pH of the sol. If the pH of the sol exceeds 4.5, the stability of the sol is adversely affected and the sol will tend to form an irreversible gel within a short period of time and hence will become unsuitable for further handling and use. If the gel forms in a bed of anion-exchange material, it will render the bed inoperative for further use until extensive cleaning of the bed is undertaken. Hence it is essential in the practice of this process that the pH of the sol in contact with the sulfate form of the anion-exchange material should not be allowed to exceed 4.5. As will be seen from the description herein, this can be accomplished by the sequence in which the cation-exchange material and anion-exchange material are employed and/or by the rate of flow of the sol through a bed of the anion-exchange material.

By using the sulfate form of a water-insoluble anion-exchange material under the conditions described herein it is possible to obtain the proper pH values in the sol, and the resulting sol is sufficiently fluid for further operations such as pumping, temporary storage and the like.

As examples of the anion-exchange materials which may be employed in this invention may be mentioned the sulfate form of weak anion-exchange materials such as water-insoluble copolymers of styrene and divinyl benzene containing nuclear amine groups, for example, products such as described in U.S. Patent No. 2,366,008 or containing polyalkylamine groups; water-insoluble polymerized reaction products of an aromatic amine, for example, metaphenylene diamine and formaldehyde; water-insoluble polymerized reaction products of an alkylene polyamine, such as ethylene diamine, diethylene triamine and the like, with phenol and formaldehyde, for example, products such as those described in U.S. Patent No. 2,341,907; and resinous reaction products, such as those described in U.S. Patent No. 2,591,574 of a primary amine or a secondary amine or mixtures thereof and an insoluble, cross-linked copolymer of an aromatic monovinyl hydrocarbon and an aromatic divinyl hydrocarbon, which copolymer contains haloalkyl groups having the formula —$C_nH_{2n}X$, wherein X is a chlorine or a bromine atom and —$C_nH_{2n}$— is an alkylene group in which $n$ is an integer of a value from one to four. As examples of commercially available weak anion-exchange materials of the latter type of product may be mentioned "Dowex" 3 or "Amberlite" IR-45. In general, the base form of a suitable weak anion-exchange material has a titration curve similar to that of Figure 6 on page 8 of "Encyclopedia of Chemical Technology," volume 8 (1952), published by the Interscience Encyclopedia, Inc., New York. Such materials generally contain a plurality of —$NH_2$, or —$NR_2$ groups, where R is an aliphatic radical.

The preferred class of anion-exchange materials for use in the processes of this invention is the sulfate form of water-insoluble strong anion-exchange materials containing a plurality of salt-forming nitrogen atoms, including the sulfate form of strongly basic quaternary ammonium anion-exchange material resins. As examples of particular resins or materials which may be used, may be mentioned the sulfate form of the water-insoluble resinous reaction product of a tertiary mono-amine and a halomethylated copolymer of a monovinyl aromatic hydrocarbon and a divinyl aromatic hydrocarbon, such as the resinous reaction products described in U.S. Patent No. 2,591,573; the sulfate form of the water-insoluble reaction product of a tertiary mono-amine such as trimethylamine and a chloromethylated copolymer of a mixture of styrene, aralkyl vinyl aromatic hydrocarbon and a divinyl aromatic hydrocarbon (of which the commercially available "Dowex" 11 is an example) and the sulfate form of the water-insoluble resinous reaction product of a tertiary mono- or dialkyl N-substituted alkanolamine or alkanediol amines with a vinyl-aromatic resin having halomethyl radicals attached to its aromatic nuclei, for example, the resinous reaction products described in U.S. Patent No. 2,614,099. In general, the base form of the suitable strong anion-exchange materials has a titration curve similar to that of Figure 7 on page 8 of "Encyclopedia of Chemical Technology," volume 8 (1952), published by the Interscience Encyclopedia, Inc., New York. The sulfate form of the anion-exchange material employed should have a capacity of at least 0.5, preferably at least 1.5 milligram equivalents per gram of dry resin.

When the sulfate form of the anion-exchange material has been used to the extent that it is no longer capable of removing mineral acid anions from the sol or is no longer capable of removing such anions efficiently, it thereby has been converted in part to the bisulfate form. However, it can be readily regenerated by water, that is converted to the sulfate form by suitable treatment with water per se. Thus, when the anion-exchange material has been used to remove or absorb sulfate ions from the sol, the material is readily regenerated or converted to the sulfate form by treating the bed of the anion-exchange material with water, unless such anion-exchange material has lost its capacity due to siliceous accretions as described above. This treatment may be carried out concurrent or counter-current to the direction in which the sol had previously passed through the bed. Similarly, when the anion-exchange material has been used to remove or absorb mineral acid anions other than sulfate anions from the sol, it is usually necessary to regenerate the anion-exchange material to the sulfate form by contacting the bed thereof with water, and the flow of water may be either current or counter-current to the direction in which the sol had previously passed through the bed.

Since the water which is used to regenerate the anion-exchange material displaces mineral acid anions from the anion-exchange material, such water may be used to at least partially regenerate the cation-exchange material to the hydrogen form. While the amount of acid in the water is usually not sufficient for complete regeneration of the cation-exchange material, usually less than half of the acid normally required to regenerate such material need be supplied in addition to that in the water obtained from the anion-exchange material thus effecting a considerable saving in the cost of the chemical regenerants for the cation-exchange materials.

The regeneration of the bisulfate form of the strongly basic anion-exchange material to the sulfate form with water can be carried out in less time and with less water than is required in the regeneration of the corresponding weakly basic anion-exchange material. It is primarily for this reason that the use of the sulfate form of the strongly basic anion-exchange material is preferred in the instant process.

In carrying out the purification of acidic silica hydro-organosols, it is important, as previously noted herein, that the pH of the hydro-organosol be controlled during removal of the dissolved salt cations and anions in the sol in order to avoid gelation of the sol, and also to remove such cations and anions as efficiently and completely as possible. The pH conditions existing in the sol during cation and anion removal vary to some extent depending on the order in which the cation- and anion-exchange materials are employed. If the starting hydro-organosol is first contacted with the anion-exchange material, the pH of the starting sol rises due to the removal of mineral acid anions from the sol. In order to avoid gelation of the sol it is necessary to remove the sol from contact with the anion-exchange material before the pH of the sol exceeds 4.5. Accordingly, it is not practical to use an acidic silica hydro-organosol at a pH of about 3.5 to 4.0 when such sol is to be contacted first with the anion-exchange material, since only relatively small amounts of mineral acid anion can be removed from such sol before the pH of the sol exceeds 4.5. It is preferable in order to obtain greater efficiency of the anion-exchange material, to employ an acidic hydro-organosol having a pH of about 1.5 to 3.5 and preferably a pH between 1.8 and 3.0. In such instances, the sol can be maintained in contact with the anion-exchange material until the pH of the sol increases, but does not exceed 4.5. Usually satisfactory removal of the mineral acid anion is obtained when the pH is in the range of 3.5 to 4.5, preferably 3.5 to 4.0 and the sol is then removed from contact with the anion-exchange material.

The resulting sol is then contacted with the strong cation-exchanger to remove metallic cations from the sol and this results in a decrease in pH of the sol below 3.5, and usually between 1.8 and 3.3. If the resulting acidity of the sol is objectionable, the pH of the sol can be increased by again contacting the sol with the sulfate form of the ion exchange material until the pH is between 3.5 and 4.5, and preferably between 3.5 and 4.0.

If the starting acidic silica hydro-organsol contains between about 0.3% and 0.6% of a dissolved salt of an alkali metal cation and a mineral acid anion, it is usually necessary to contact such sol successively with the anion-exchange material, the cation-exchange material, the anion-exchange material and then with the cation-exchange material if a sol containing less than 0.05% by weight of dissolved salt is desired. If, after the bisulfate form of the anion-exchange material has been regenerated to the sulfate form with water for at least 5 to 20 exchange-regeneration cycles and the anion-exchanger has lost about one-half of its capacity, the anion-exchange bed should be treated with an alkali metal hydroxide as described above.

In another embodiment of this process the acidic silica hydro-organosol is first contacted with the cation-exchange material. This results in the removal of metallic cations from the sol and causes a decrease in the pH of the sol which can drop to a pH of 1.8 to 2. Since the removal of metallic cations is not efficient when the initial sol is at a low pH, it is here preferred to employ an initial sol having a pH in the range of about 3.0 to 4.5 and to maintain contact between the sol and the cation exchanger until the pH of the sol drops below 2.5, and preferably down to about 1.8 to 2.0. At these pH values the sol is quite stable, for example, for a period of about one week or more at temperatures below 15° C., and there is little danger that the sol will form a gel. The resulting sol is then contacted with the sulfate form of the anion-exchange material to remove mineral acid anions from the sol. This results in an increase in the pH of the sol, and it is essential that the sol be separated from the anion-exchange material before the pH exceeds 4.5, otherwise the sol is relatively unstable toward gelation and gels rather quickly even at low temperatures. The sol can be separated from the anion-exchange material at a pH between 3.0 and 4.5 and the pH of the separation will depend to a large extent on the use to which the sol is put. If the sol is to be used within a relatively short period of time, for example, within 12 to 24 hours, the sol may be separated from the anion-exchange material at a pH as high as 4.5. However, if the sol is to be stored for 24 to 48 hours or more, it should be separated from the anion-exchange material at a pH of about 3.0 to 4.0.

When using the procedure described in the preceding paragraph, with starting hydro-organosols containing more than 0.3%, or from 0.3% to 0.6% of dissolved salt, it is usually necessary to further contact the sol with strong cation-exchanger and the sulfate form of the anion-exchange material, after the initial treatment, if a sol containing less than 0.05% by weight of such salt is to be obtained.

The starting hydro-organosol can be contacted with the ion-exchange materials in a variety of ways. For example, the exchange material can be added to the sol and then removed from the sol by filtration, centrifugation or the like when the desired pH has been obtained. Alternatively, the exchange material can be suspended in a moving stream of the sol in the form of a fluidized bed and subsequently separated from the sol, or the sol can be passed through a fixed bed of an exchange material. The latter procedure is preferred since it enables accurate and efficient control of the pH of the sol. When fixed beds of exchange materials are used, the movement of the sol through the bed may be upward or downward. However, from the standpoint of simplicity of operation, it is desirable to allow the sol to flow downwardly by gravity through the bed of the exchange material, but this is not necessarily the most efficient procedure.

If the hydro-organosol is cloudy or contains suspended matter, it is preferred to remove the suspended matter therefrom before passing it through a bed of the exchange material. This is suitably accomplished in the case of sols containing particles of gel or other solid matter larger than colloidal size, by filtration, centrifugation or the like and is preferably done by passing the sol through a filter, for example, a sand filter. Such a filtration process, while helpful, does not prevent some siliceous material from accumulating and accreting on the surface of anion-exchanger particles as previously described.

It is the above-described processes of removing salts from acidic silica hydro-organosols by means of cation-exchange materials and anion-exchange materials during which the anion-exchange material loses its capacity after a number of cycles, as previously described, with which the reconditioning of the anion-exchange materials according to the processes of the present invention are concerned, as previously described and as described in greater detail in the following examples.

EXAMPLE 1

An acidic silica ethanol-aquasol at a temperature of 20° C. and having a colloidal silica content of 9.5%, a sodium sulfate content of 0.3%, an ethanol content of 50%, a water content of 40%, and containing sufficient free sulfuric acid to provide a pH of about 3.0 (glass electrode) was pumped through a sand filter to remove suspended solid particles therein and then through a column of a strong cation-exchange resin at an average rate of 130 grams per minute. This column was 2 inches in diameter and 34 inches high, consisted of water-insoluble beads of the hydrogen or acid form of "Dowex" 50 (a strong cation-exchange resin consisting of water-insoluble beads of a copolymer of styrene, ethylvinylbenzene and divinylbenzene, which copolymer contains nuclear sulfonic acid groups), which is described in vol. 69, p. 2830, of the Journal of the American Chemical Society as having a capacity of 4.25 m.e. (milligram equivalents) per gram. The ethanol-aquasol was allowed to pass through the column until the composite effluent from the column had a pH of 2.0 (glass electrode), and this composite effluent was substantially free of sodium ions.

The composite effluent from the cation-exchange resin was next passed downwardly through a column of water-insoluble strong anion-exchange material (Dowex 11) in the sulfate form at an average rate of 80 grams per minute. This column, which was 1 inch in diameter and 36 inches high contained about .008 cubic foot of resin consisting of water-insoluble beads (that would pass through a 16-mesh but would be retained on a 20-mesh U.S. standard screen) of the sulfate form of a strongly basic quaternary ammonium anion-exchange resin composed of the reaction product of trimethylamine and a chloromethylated copolymer of about 87% by weight of styrene, 5% by weight of ethylvinylbenzene and 8% by weight of divinylbenzene, immersed in sufficient water to cover the beads. The anion-exchange material had a capacity of about 1.69 m.e. per gram. Samples of the effluent from the anion-exchange column were analyzed for the sulfate ion periodically by titrating the sample with a solution of barium perchlorate in isopropanol using thorin as an indicator for excess barium ions. During the major part of the run through this column, the sulfate content of the effluent was about 0.0005% calculated as $Na_2SO_4$, and the specific conductance, at 20° C., of the effluent from the column at the beginning of the run was 56 micromhos. As the point of exhaustion of the anion-exchange column was reached, the sulfate content, calculated as $Na_2SO_4$, of the entire collected effluent increased to 0.0024%, and the specific conductance at 20° C. was 93 micromhos. At this stage the pH (glass electrode) of the total effluent was about 4.0 and collection of the composite effluent and flow of the hydro-organosol through the column was then discontinued. The composite-effluent was an acidic silica water-alcohol sol (alcosol) having a pH of about 4.0, due primarily to a small amount of residual sulfuric acid and $NaHSO_4$, and contained less than 0.01% by weight of $Na_2SO_4$, but otherwise had the same composition as the starting sol. The composition effluent remained in a fluid, pumpable condition for at least 24 hours at a temperature of 20 to 30° C. The anion-exchange material used, which had been converted in part to the bisulfate form, was regenerated by first passing natural water having a hardness of 30 p.p.m. (calculated as $CaCO_3$) upwardly through the column at a ratio sufficient to fluidize the resin particles so as to remove trapped or suspended material and then the treatment of the material was continued, using additional amounts of such natural water until no turbidity could be detected in the wash water effluent after the addition of 2 drops of 1 molar barium chloride solution to 5 milliliters of such effluent.

After the anion-exchange column had been used to remove sulfate ions in acidic silicic hydro-organosols according to the procedure set forth in the preceding paragraph and then regenerated with water for six or seven cycles, a gradual cumulative loss in the ability of the resin to remove the sulfate ions became apparent with each successive cycle as indicated by the progressively lower quantities of sol which could be passed through the anion-exchange bed prior to its exhaustion. After 20 such cycles this loss of capacity of the anion-exchange column was greater than 50% of its original capacity as shown in the following table.

Table

LOSS OF ANION-EXCHANGE CAPACITY FOR ACIDIC SILICA HYDRO-ORGANOSOLS WITH PROGRESSIVE CYCLING

| Cycle No. | pH of Affluent | pH of Effluent | Effluent $SO_4^=$ percent in Effluent | Yield of Silica Sol (Gallons per cubic ft. of resin) |
|---|---|---|---|---|
| 2 | 2.00 | 4.0 | 0.004 | 89 |
| 5 | 2.01 | 4.0 | 0.005 | 85 |
| 8 | 2.01 | 4.0 | 0.006 | 60 |
| 11 | 2.00 | 3.74 | 0.005 | 48 |
| 14 | 1.97 | 3.23 | 0.004 | 50 |
| 17 | 2.08 | 3.35 | 0.005 | 50 |
| 20 | 2.00 | 3.48 | 0.005 | 37 |

The yield of the sol was determined when measurements showed that $SO_4^=$ anions were at a substantially decreased rate being removed by the anion-exchange resin from the sols. Such $SO_4^=$ ion breakthrough was determined by the barium perchlorate-thorin test for sulfates which has been described above.

The alteration of the properties of the resin after 20 cycles was not only characterized by loss of capacity but also by an increase in density. Such increase in density was evidenced by the rate of flow of water required to "lift" the anion-exchange resin during countercurrent regeneration. After the first cycle a water flow rate of 100 milliliters per minute through the exchange bed was sufficient to fluidize or "lift" the resin, that is, cause the beads to move about in the counter-current regeneration flow. In contrast, after the twentieth cycle a water flow rate of 200 milliliters per minute was required to fluidize or "lift" the anion-exchange material.

After the twentieth cycle, the anion-exchange material, which was exhausted and was in the bisulfate form, was contacted with an aqueous solution of 8% by weight of sodium hydroxide at a flow rate of about 26 milliliters per minute, at a temperature of from 30° C., to a maximum of 100° C., until the anion-exchange material had been contacted with 16 pounds of NaOH per cubic foot of the material. The first NaOH effluent was measured for silica content, using a colorimetric ammonium molybdate analytical method, which specifically demonstrated that silica was being removed from the anion-exchange column. At the end of the reconditioning process no silica could be detected in the final NaOH effluent.

During the entire time (about 70 minutes) that the resin was in contact with the sodium hydroxide solution there was no evidence of agglomeration or aggregation of the beads of the anion-exchange resin.

The hydroxide form anion-exchange material was treated with distilled water at a flow rate of 26 milliliters per minute for about 40 minutes or until the excess sodium hydroxide had been removed. The anion-exchange material was then converted from the hydroxide form to the bisulfate form by contacting the material with an aqueous solution of 10% by weight of sulfuric acid at a flow rate of 26 milliliters per minute at a temperature between 25° C. and 35° C. for about seventy-five minutes or until the anion-exchange material had been contacted with 20 pounds $H_2SO_4$ per cubic foot of the material. The sodium hydroxide, water and sulfuric acid treatments were all run countercurrent to the direction of flow of the resin through the anion-exchange bed.

The bisulfate form of the resin was then contacted with water at a rate of flow of 100 milliliters per minute through the anion-exchange material for about 100 minutes or until the conductivity of the effluent had been reduced to 2160 micromhos and the said material had been converted to the sulfate form.

The reconditioned resin bed was again employed to remove $SO_4^=$ anions from an acidic silica hydro-organosol and the anion-exchange material was found to have substantially regained its original capacity to remove sulfate ions from the sol. The anion-exchange column removed the $SO_4^=$ anions from 77 gallons of acidic silica hydro-organosol per cubic foot of anion-exchange resin before requiring water regeneration. It should be noted that prior to the above treatment it was possible to remove $SO_4^=$ anions from only 37 gallons per cubic foot of resin of a similar silica ethanol aquasol. The water flow-rate required to "lift" the resin during regeneration amounted to about 100 milliliters per minute in contrast to a flow-rate of 220 milliliters per minute required immediately prior to the reconditioning step of contacting 16 pounds of NaOH per cubic foot of resin described above. The reconditioned resin bed was employed in a total of 20 anion-exchange-regeneration cycles as heretofore described before it became necessary to repeat the reconditioning process.

EXAMPLE 2

An acidic silica ethanol aquasol of essentially the same composition of the acidic silica ethanol aquasol of Example 1, and at a temperature of 20° C., was passed downwardly through a column of the sulfate form of the anion-exchange material described in Example 1, maintaining the pH below 4.5. The sol was then passed downwardly through the acid form of the cation-exchange material of Example 1, maintaining a pH of between 3.5 and 4.0. The effluent consisted of a sol containing less than 0.01% sodium sulfate.

As the anion-exchange column was subjected to successive exchange-water regeneration cycles it was again found that progressively smaller volumes of the sol could be passed through the resin bed before such bed became exhausted as indicated by $SO_4^=$ anion breakthrough and a failure of the sol to rise to pH 4. It was again noted that the resin became denser requiring a greater flow rate in order to fluidize or "lift" it during countercurrent water regeneration. After 20 anion-exchange regeneration cycles, the capacity of the anion-exchange material had decreased by 50%. The anion-exchange column was regenerated with water to the sulfate form and consisted of a mixture of the sulfate form and the bisulfate form of anion-exchange resin and was next contacted with 20 pounds of NaOH (in the form of a 4% aqueous solution of sodium hydroxide) per cubic foot of resin. As in Example 1, the presence of silica and/or silicic acid was again demonstrated in the initial sodium hydroxide countercurrent effluent. The beads of the anion-exchange resin bed were rigid during the initial contact with the sodium hydroxide solution but gradually fluidized, that is became mobile in the countercurrent flow.

At no time was there evidence of aggregation or agglomeration of the resin beads as the silica and/or silicic acid was being removed and the anion-exchange material was simultaneously being converted to the hydroxide form. The anion-exchange resin was then counter-currently contacted with water to remove residual sodium hydroxide, converted to the bisulfate form by the sulfuric acid treatment of Example 1 and regenerated to the sulfate form with water according to the procedure of Example 1.

The reconditioned anion-exchange resin column was again employed to remove $SO_4^=$ anions from an acidic silica hydro-organosol. The anion-exchange column removed such ions from 74 gallons of acidic silica hydro-organosol per cubic foot of anion-exchange resin before requiring water regeneration, thereby demonstrating that the capacity of said resin to remove $SO_4^=$ anions had been substantially restored to its initial 77 gallon capacity.

EXAMPLE 3

A process such as in Example 1 was carried out except that the silica ethanol-aquasol employed had a colloidal silica content of 10.5%, a sodium sulfate content of 0.6%, an ethanol content of about 40% and a water content of about 50% and contained sufficient free sulfuric acid to provide a pH of about 3 (glass electrode) and the anion-exchange resin was the sulfate form of a weak anion-exchange resin. The anion-exchange resin consisted of the reaction product of diethylene triamine and a chloromethylated copolymer of about 87% of styrene, 5% of ethyl vinylbenzene and 8% divinylbenzene and was contacted with the acidic ethanol aquasol at an average rate of about 20 milliliters per minute at a temperature of about 25° C. This anion-exchange material had a capacity of 1.69 m.e. per gram.

About three times the amount of water, e.g., 100 milliliters per minute for five hours, were required to regenerate the anion-exchange bed as evidenced by lack of turbidity of the effluent from the column upon the addition of 2 drops of 1 molar barium chloride solution to 5 milliliters of the effluent. During the anion-exchange-regeneration cycles, which except as hereinbefore noted were carried out as in Example 1, a progressive loss of ability of the anion-exchange resin to remove $SO_4^=$ anions became evident. The quantity of acidic ethanol-aquasol which could be passed through the bed before $SO_4^=$ anion breakthrough decreased from 79 gallons to 33 gallons of effluent per cubic foot of anion-exchange resin after 20 cycles. The anion-exchange particles again became denser as evidenced by an increase in initial flow rate from about 100 milliliters of water per minute to about 190 milliliters of water per minute after 19 cycles, which were required to fluidize or "lift" the resin beads.

The weak anion-exchange resin was successively treated with sodium hydroxide, water, sulfuric acid, and water, the quantities of material and flow rate being respectively the same as those described in Example 1. After such treatment the anion-exchange material had regained its regeneration capacity to the extent that 75 gallons of fresh acidic silica organo-aquasol could be passed through one cubic foot of anion-exchange bed before $SO_4^=$ anion breakthrough occurred. Again there was no aggregation or agglomeration of the anion-exchange particles during the process and after the reconditioning step the density of the anion-exchange material was substantially the same as when first used.

EXAMPLE 4

Experiments were carried out as described in Examples 1 through 3 with the exception that the starting sols contained acetone instead of ethanol but were otherwise identical with the starting sols of the preceding examples. After 20 anion-exchange-regeneration cycles the anion-exchange materials had significantly lost their anion-exchange capacity in substantially the same manner as heretofore described in the preceding examples. When subjected to the identical reconditioning procedures of the Examples 1 through 3, the anion-exchange materials were capable of being used to remove sulfate anions from further acidic silica ethanol-aquasols or from acidic silica acetone aquasols in quantities of about 70 gallons per cubic foot of resin per cycle as contrasted with about 35 gallons per cubic foot of resin per cycle after the twentieth cycle and before the reconditioning process was used.

As previously indicated the preferred class of anion-exchange materials for use in the processes herein described is the sulfate form of strong anion-exchange materials including the sulfate form of strongly basic quaternary ammonium anion-exchange material resins. These resins are generally unstable to strong alkalies such as alkali metal hydroxides. When solutions of from 4% to 12% of an alkali metal hydroxide such as sodium hydroxide, in amounts equivalent to from about 14 to about 20 pounds of NaOH per cubic foot of material, are used to contact the anion-exchange material, the resin is not damaged or decomposed. If smaller amounts of sodium hydroxide per cubic foot of resin are used the 16/20 mesh beads of anion-exchange material agglomerate in hard lumps and remain in that condition after sulfuric acid is used to convert the anion-exchange material to the bisulfate form. The agglomerated anion-exchange material which has lost a considerable portion of its surface area still contains gelled silicious materials and its capacity to remove anions from the above-described sols is limited. The agglomerated anion-exchange materials are also difficult to disperse.

When such anion-exchange materials, which are contaminated with siliceous materials, are contacted with 16 pounds of NaOH per cubic foot of resin in the form of an 8% by weight aqueous sodium hydroxide solution as in the preferred process of this invention, the anion-exchange materials remain dispersed and can be readily re-used after the above-described regeneration treatment.

The criticality of the amount of alkali metal hydroxide used to recondition the anion-exchange resin is illustrated by the following. Attempts were made to recondition the anion-exchange material with aqueous solutions of sodium hydroxide which theoretically would convert the silica and/or silicic acid to sodium silicate and the mineral acid anions to the sodium salt, thereby converting the anion-exchange material to the base or hydroxide form. However, since many strong anion-exchange materials are decomposed by alkalies, a 4.0% aqueous solution of sodium hydroxide was used in such amounts that the "exhausted" resin was contacted with 4 pounds of NaOH per cubic foot of resin as above-described. This amount of NaOH was 137% of the amount theoretically required to convert silica and/or silicic acid to sodium silicate and to convert the sulfate, or bisulfate form of the anion-exchange material to the hydroxide form. After the NaOH had been passed through the anion-exchange column, it was found that the beads of the anion-exchange material had become "cemented" or agglomerated in hard lumps causing the exchange surface of the anion-exchange material to be reduced and further reducing and restricting the flow and the rate of flow of the acidic silica hydro-organosol through the anion-exchange column.

Subsequently an 8% aqueous solution of sodium hydroxide was contacted as above-described with the bisulfate form of the anion-exchange material on which siliceous materials had accumulated, in amounts of 8 pounds of NaOH per cubic foot of anion-exchange material, representing a quantity of NaOH greater than 270% of the amount theoretically required to remove a silicic acid and mineral acid anions from the anion-exchange material and to convert said material to the base form. Again, the effects were deleterious. The particles aggregated in hard agglomerates reducing the flow and rate of flow of the sol through the resin bed, while the capacity of the anion-exchange material to remove mineral acid anions from the sol remained critically impaired.

What is claimed is:

1. In a process wherein an acidic silica hydro-organosol containing small amounts of an alkali metal salt is contacted, in any sequence, with the hydrogen form of a water-insoluble strong cation-exchange material and with the sulfate form of an anion-exchange material containing salt-forming nitrogen atoms, to lower the salt content of said hydro-organosol, said cation-exchange resin is regenerated and re-used and said anion-exchange material is regenerated from the bisulfate form to the sulfate form by treatment with water and the process is repeated until an appreciable loss of the original capacity of said anion-exchange material, when substantially in the sulfate form, to remove mineral acid anions from said hydro-organosols has occurred, the improvement in increasing the capacity of said anion-exchange material for further use in said process and in other processes, which comprises the step of treating said last-mentioned anion-exchange material when in a form selected from the group consisting of the sulfate form, the bisulfate form and mixtures of said forms with an aqueous solution of an alkali metal hydroxide containing from about 4% to about 12% by weight of said alkali metal hydroxide in an amount equivalent to more than 500% of said hydroxide theoretically required to convert said anion-exchange material to the hydroxide form.

2. A process as in claim 1 wherein the anion-exchange material which has appreciably lost its capacity to remove mineral acid anions and is in the sulfate form is treated with said aqueous solution of alkali metal hydroxide.

3. A process as in claim 1 wherein the anion-exchange material which has appreciably lost its capacity to remove mineral acid anions and is in the bisulfate form is treated with said aqueous solution of alkali metal hydroxide.

4. A process as in claim 1 wherein the anion-exchange material, which has appreciably lost its capacity to remove mineral acid anions and is in the form of a mixture of the bisulfate and sulfate form of said material is treated with said aqueous solution of alkali metal hydroxide.

5. A process as in claim 1, but being further characterized in that the acidic silica hydro-organosol contains water, from about 5% to 12% by weight of silica as silicic acid, from about 25% to 60% by weight of a water miscible organic liquid consisting of carbon, hydrogen and oxygen atoms and a mineral acid in an amount sufficient to provide a sol having a pH of about 1.8 to about 4.5.

6. A process as in claim 5, but further characterized in that the organic liquid present in the sol is ethanol.

7. A process as in claim 5, but further characterized in that the organic liquid present in the sol is acetone.

8. A process as in claim 5, but further characterized in that the mineral acid present is sulfuric acid.

9. A process as in claim 6, but further characterized in that the cation-exchange material is a sulfonated polymerizate of a poly-vinyl aryl compound and a monovinyl aryl compound and wherein the first mentioned anion-exchange material is the sulfate form of a strongly basic quaternary ammonium anion-exchange resin.

10. A process as in claim 5, but further characterized in that the acidic silica hydro-organosol is contacted with the said cation-exchange material to provide a sol having a pH within the range of about 1.8 to 2.5 and thereafter is contacted with said anion-exchange material substantially in the sulfate form to provide a sol having a pH within the range of about 3.0 to 4.0, said sol containing less than 0.05% by weight of said alkali metal salt.

11. In a process wherein an acidic silica ethanol-aquasol containing from about 0.1% to about 0.6% of sodium sulfate is contacted, in any sequence, with the hydrogen form of a water-insoluble, strong cation-exchange material and with the sulfate form of a water insoluble strong anion-exchange material containing a plurality of salt-forming nitrogen atoms to lower the sodium sulfate content of said sol, said cation-exchange material is regenerated to the hydrogen form and said anion-exchange material is regenerated from the bisulfate form to the sulfate form by treatment with water and the process is repeated until the capacity of said anion-exchange material when in the sulfate form to remove mineral acid anions is substantially diminished by virtue of contamination with siliceous materials from said sol, the improvement in increasing the capacity of said contaminated anion-exchange material for further use in said process which comprises the steps of treating said anion-exchange material, while in a form of a mixture of the sulfate form and the bisulfate form of said anion-exchange material, with an aqueous solution of sodium hydroxide containing from about 4% to about 8% by weight of NaOH in an amount of from 12 to about 20 pounds of NaOH per cubic foot of said anion-exchange material to convert said anion-exchange material to the hydoxide form and for a period of time to substantially restore the original capacity of said anion-exchange material to remove mineral acid anions from said silica sol, thereafter contacting said anion-exchange material with an aqueous solution of sulfuric acid until said anion-exchange material is converted to the bisulfate form, and thereafter contacting said anion-exchange material with water until the anion-exchange material has been converted to the sulfate form prior to contacting said anion-exchange material with additional hydro-organosol according to the aforesaid process.

12. A process as in claim 11, but further characterized in that the acidic silica ethanol aquasol contains water, from about 5% to 12% by weight of silica as silicic acid, from about 25% to 60% by weight of ethanol and sulfuric acid in an amount sufficient to provide a sol having a pH of about 1.8 to 4.5.

13. A process as in claim 12 but further characterized in that the cation-exchange material is a sulfonated polymerizate of a polyvinyl compound and a monovinyl aryl compound and wherein the first mentioned anion-exchange material is the sulfate form of a strongly basic quaternary ammonium anion-exchange resin.

14. A process as in claim 12 but further characterized in that said acidic ethanol-aquasol is contacted with said cation-exchange material to provide a sol having a pH within the range of about 1.8 to 2.5 and the resulting sol is thereafter contacted with the sulfate form of a water insoluble weak anion-exchange material to provide a sol having a pH within the range of about 3.0 to 4.0 and containing less than 0.025% by weight of sodium sulfate.

15. In a process wherein an acidic silica ethanol-aquasol containing water from about 5% to 12% by weight of silica as silicic acid, from about 25% to 60% by weight of ethanol, from 0.1% to about 0.6% by weight of sodium sulfate and sulfuric acid in an amount sufficient to provide a sol having a pH of about 1.8 to 4.5 is contacted, in any sequence, with the hydrogen form of a strong cation-exchange material and with the sulfate form of a strong anion-exchange material consisting essentially of a water-insoluble, strongly basic, quaternary ammonium anion-exchange resin to lower the sodium sulfate content of said sol, said cation-exchange material is regenerated to the hydrogen form and said anion-exchange material is regenerated from the bisulfate form to the sulfate form by treatment with water and the process is repeated until the capacity of said anion-exchange material, when in the sulfate form, to remove mineral acid anions is substantially diminished by virtue of contamination with siliceous materials from said sol, the improvement in increasing the capacity of said contaminated anion-exchange material for further use in said process which comprises the step of treating such anion-exchange material, while in a form of a mixture of the sulfate form and the bisulfate form of said anion-exchange material, with an aqueous solution of sodium hydroxide containing from about 4% to about 8% by weight of a NaOH in an amount of from about 12 to about 20 pounds of NaOH per cubic foot of said anion-exchange material to convert said anion-exchange material to the hydroxide form and for a period of time to substantially restore the original capacity of said anion-exchange material, when in the sulfate form, to remove mineral acid anions from said silica sol.

References Cited in the file of this patent

UNITED STATES PATENTS

| 2,669,713 | Osmun | Feb. 16, 1954 |
| 2,772,237 | Bauman et al. | Nov. 27, 1956 |
| 3,051,657 | Power | Aug. 28, 1962 |

FOREIGN PATENTS

| 611,914 | Great Britain | Nov. 5, 1948 |